United States Patent
Zhou et al.

(10) Patent No.: US 11,868,284 B2
(45) Date of Patent: Jan. 9, 2024

(54) PERIPHERAL DEVICE WITH EMBEDDED VIDEO CODEC FUNCTIONALITY

(71) Applicant: Rongming Microelectronics (Jinan) Co., Ltd., Shandong (CN)

(72) Inventors: Yan Jun Zhou, Coquitlam (CA); Tao Zhong, Coquitlam (CA); Wei Liu, Surrey (CA)

(73) Assignee: Rongming Microelectronics (Jinan) Co., Ltd., Shandong (CN)

( * ) Notice: Subject to any disclaimer, the term of this patent is extended or adjusted under 35 U.S.C. 154(b) by 0 days.

(21) Appl. No.: 17/852,350

(22) Filed: Jun. 28, 2022

(65) Prior Publication Data

US 2022/0327071 A1 Oct. 13, 2022

Related U.S. Application Data

(62) Division of application No. 17/100,435, filed on Nov. 20, 2020, now Pat. No. 11,422,956, which is a division of application No. 16/415,759, filed on May 17, 2019, now Pat. No. 10,860,504.

(60) Provisional application No. 62/779,868, filed on Dec. 14, 2018.

(30) Foreign Application Priority Data

Dec. 5, 2018 (CN) .......................... 201811478858.3
Dec. 5, 2018 (CN) .......................... 201811479224.X

(51) Int. Cl.
G06F 13/16 (2006.01)
G06F 13/42 (2006.01)
H04N 19/423 (2014.01)

(52) U.S. Cl.
CPC ...... *G06F 13/1668* (2013.01); *G06F 13/4282* (2013.01); *H04N 19/423* (2014.11); *G06F 2213/0026* (2013.01)

(58) Field of Classification Search
CPC ............ G06F 13/1668; G06F 13/4282; H04N 19/423
See application file for complete search history.

(56) References Cited

U.S. PATENT DOCUMENTS

| | | |
|---|---|---|
| 2005/0249081 A1 | 11/2005 | Lin |
| 2016/0094619 A1* | 3/2016 | Khan ...................... G06F 3/061 709/203 |

FOREIGN PATENT DOCUMENTS

| | | |
|---|---|---|
| CN | 106095329 A | 11/2016 |
| CN | 108460721 A | 11/2016 |
| KR | 20010063803 A | 7/2001 |
| KR | 20180111492 A | 10/2018 |
| WO | 2016048598 A1 | 3/2016 |
| WO | 2018201249 A1 | 11/2018 |

* cited by examiner

*Primary Examiner* — David E Martinez
(74) *Attorney, Agent, or Firm* — Smart & Biggar LP

(57) ABSTRACT

A NVMe™ or NVMe-over-fabrics enabled device with video codec functionality may be seen to overcome scalability problem of known hardware assisted video codec solutions. The device of aspects of the present application may or may not have storage media. A host computer communicates with the device through NVMe™ commands. The device may be in one of many SSD form factors, such as U.2 or AIC. The device may be provided as a component in NVMe-enabled computers or NVMe-over-fabrics-enabled systems.

24 Claims, 12 Drawing Sheets

| Byte Range | Description |
|---|---|
| 3093:3072 | Reserved |
| 3094 | Number of video codec modules 1-16 |
| 3095 | Reserved |
| 3127: 3096 | Attributes of video codec module NO.1 |
| 3159: 3127 | Attributes of video codec module NO.2 |
|  |  |
| 3096+M*32-1: 3096+(M-1)*32 | Attributes of video codec module NO.M |
|  |  |
| 3607: 3576 | Attributes of video codec module NO.16 |
| 4095: 3608 | Reserved |

FIG. 4

| Byte Range | Description |
|---|---|
| 0 | Module ID,<br>1-N, N is the total number of modules |
| 1 | Type, 0:encoder, 1:decoder |
| 2 | Compressed video format<br><table><tr><th>Bit Location</th><th>Description</th></tr><tr><td>0</td><td>Support H.264/AVC<br>0: No, 1: Yes</td></tr><tr><td>1</td><td>Support H.265/HEVC<br>0: No, 1: Yes</td></tr><tr><td>2</td><td>Support VP9<br>0: No, 1: Yes</td></tr><tr><td>3: 7</td><td>Reserved</td></tr></table> |
| 3 | Reserved |
| 5: 4 | Maximum number of codec instances per module |
| 7: 6 | Processing capability –<br>Number of 1080p frames per second |
| 9: 8 | Maximum Picture Width |
| 11: 10 | Maximum Picture Height |
| 13: 12 | Minimum Picture Width |
| 15: 14 | Minimum Picture Height |
| 31: 16 | Other details of capabilities, such as Profile, Level, etc. ASCII string terminated with \0 |

FIG. 5

| Opcode | Description | Command Name |
|---|---|---|
| C1h | Allocate and initialize a video codec instance | Xcoder-Open |
| C2h | Close a video codec instance | Xcoder-Close |
| C3h | Query the status of a video codec module | Xcoder-Query |
| C4h | Reconfigure a video codec instance | Xcoder-Reconfigure |

| Opcode | Description | Command Name |
|---|---|---|
| 83h | Transfer a video frame to a video codec instance | Xcoder-Write |
| 84h | Read a video frame from a video codec instance | Xcoder-Read |

FIG. 6

PERIPHERAL DEVICE WITH EMBEDDED VIDEO CODEC FUNCTIONALITY

CROSS-REFERENCE TO RELATED APPLICATIONS

The present application is a divisional application of U.S. patent application Ser. No. 17/100,435 filed Nov. 20, 2020, which is a divisional application of U.S. patent application Ser. No. 16/415,759 filed May 17, 2019, which claims priority to U.S. Provisional Patent Application No. 62/779,868, filed Dec. 14, 2018, Chinese Patent Application No. 201811479224.X, filed Dec. 5, 2018, and Chinese Patent Application No. 201811478858.3, filed Dec. 5, 2018, all the contents of which are hereby incorporated herein by reference.

TECHNICAL FIELD

The present application relates, generally, to computer peripheral devices that communicate with a host computer and, more specifically, to such devices that provide video codec functionalities and to the host computer to which the devices provide the functionalities.

BACKGROUND

The quantity of known video applications executed by network-connected devices may be seen to be continuously on the rise. Correspondingly, network video traffic continues to grow. Accordingly, a demand for real-time video encoding and decoding also grows. An entity that carries out video encoding (co-) and decoding (dec) may be called a video "codec" and may be implemented as a software-only solution. Alternatively, a video codec may be implemented as a solution that combines software and hardware, in a so-called hardware-assisted solution.

It may be shown that, in many cases, software-only solutions cannot cope with the inherent computational complexity of the large amount of tasks to be carried out in a video codec. In such cases, hardware-assisted solutions are known to be more suitable. One example of a hardware-assisted video codec solution is the known Quick Sync Video (QSV) technology marketed by Intel™ of Santa Clara, CA In QSV technology, video codec modules are built into Central Processing Units (CPUs). Two further examples of hardware-assisted video codec solutions are the known NVENC technology and NVDEC technology, marketed by Nvidia™ of Santa Clara, CA In NVENC technology and NVDEC technology, video codec modules are integrated into Graphics Processing Units (GPUs). There are also known to be hardware-assisted video codec solutions that are based on Field Programmable Gate Arrays (FPGAs) and hardware-assisted video codec solutions that are based on Application Specific Integrated Circuits (ASICs). Each of these latter examples are known to use a bus that allows for a connection with a host machine according to the known Peripheral Component Interconnect express (PCIe) standard.

BRIEF DESCRIPTION OF THE DRAWINGS

Reference will now be made, by way of example, to the accompanying drawings which show example implementations; and in which:

FIG. 4 illustrates an example portion of a data structure for an NVMe™ "Identify Controller" command, in accordance with an aspect of the present application;

FIG. 5 illustrates a manner of organization for the bytes allocated to each of the video codec modules in the example data structure portion of FIG. 4, in accordance with an aspect of the present application;

FIG. 6 illustrates two tables: a vendor-specific admin commands table; and a vendor-specific NVM commands table, in accordance with an aspect of the present application;

DETAILED DESCRIPTION OF EXAMPLE EMBODIMENTS

Figure 1:
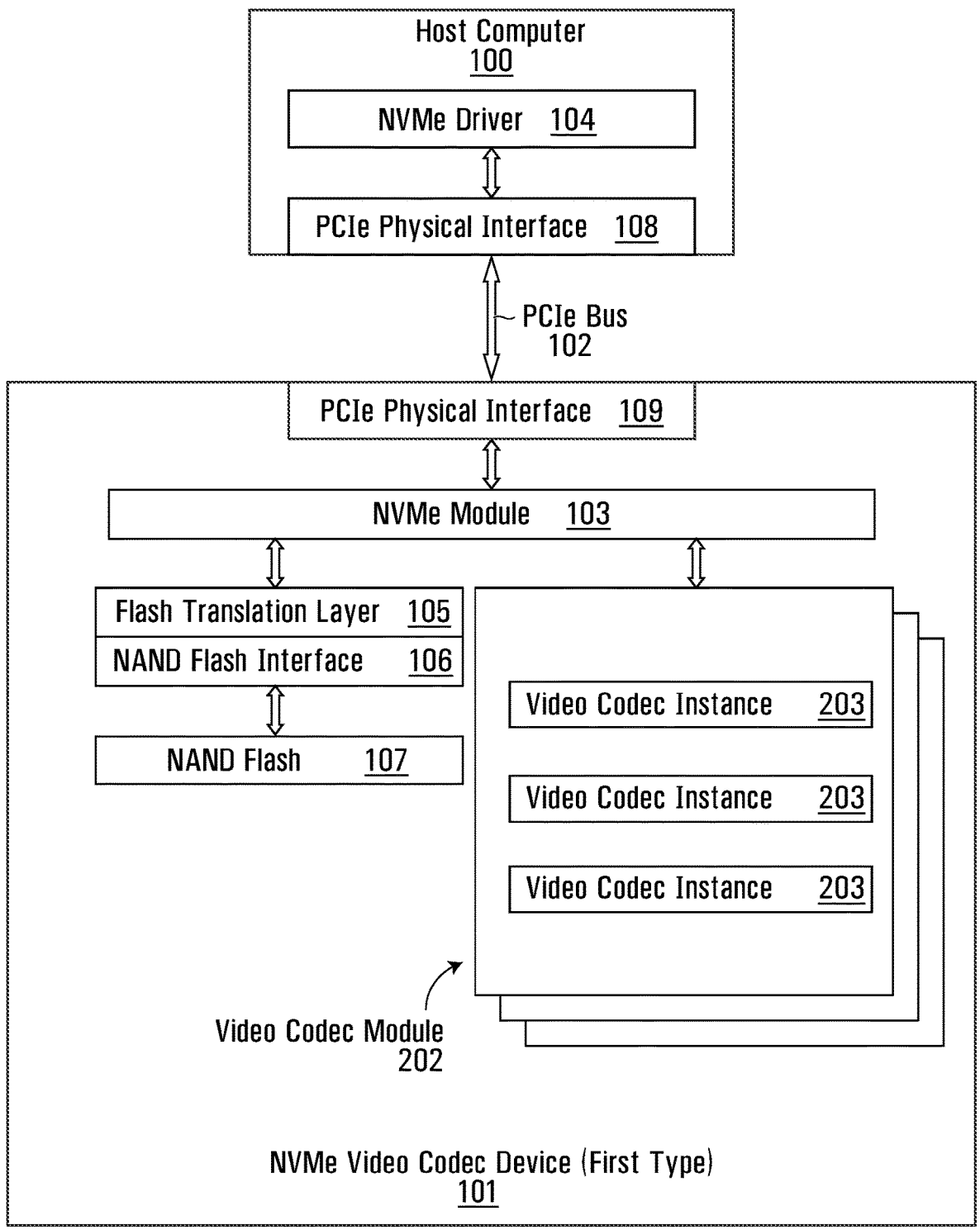
FIG. 1 illustrates an internal structure for an implementation of a first type of NVMe™ video codec device, in accordance with an aspect of the present application.

Scalability can be a problem when using video codec modules built into CPUs or integrated into GPUs. The video codec modules built into CPUs and integrated into GPUs are separate from regular computational units. Scaling up the video codec capability requires more CPUs or GPUs even when the regular computational capability of the existing CPUs or GPUs is more than enough to handle non-video-codec tasks. This may be seen to result in wasting computational power of CPUs or GPUs. Furthermore, it is not usually feasible to increase the number of CPUs in an existing computer or server. While it is feasible to increase the number of GPUs in an existing computer or server, GPUs can be expensive, power-hungry, can take up a lot of space in a computer and the number of GPUs in a computer is oftentimes very limited. As a result, the CPU-based video codec solutions and GPU-based video codec solutions may be understood to lack an ability to achieve a density of video codec modules that is sufficiently high for some applications.

The FPGA-based PCIe devices and ASIC-based PCIe devices may also be recognized as having a scalability problem, since these devices are usually provided in the form of an add-in card (AIC) that is designed to be received in a PCIe expansion slot in a computer. The number of expansion slots in a computer that can hold such cards can be very limited. In addition, in particular for a Linux system, these devices usually require special or proprietary device drivers. A requirement for special or proprietary device drivers may be seen to be problematic when upgrading an existing Linux-based computer or server to support FPGA-based PCIe devices incorporating video codec modules or ASIC-based PCIe devices incorporating video codec modules.

NVM Express® is an open collection of standards and information to fully expose the benefits of non-volatile memory in all types of computing environments from mobile to data center. This collection of standards is often referenced by the acronym NVMe™.

Aspects of the present application relate to devices with video codec functionality. Devices in aspects of the present application connect to a host computer through a PCIe bus and employ the known NVMe™ collection of standards. A device in one aspect of the present application is a NVMe-based storage device (such as a Solid State Drive) with embedded video codec functionality. A device in another aspect of the present application has video codec as its only or main functionality.

An aspect of the present application relates to a device housing a video codec module and having a form factor of an Solid State Drive (SSD). Such a device can, with such a profile, be fit into a computer or a server that has drive bays specifically suited to SSDs. There exists NVMe-based storage systems known as "Just a Bunch Of Flash" or "JBOF." A device that houses video codec modules and has an SSD form factor could be fit into a NVMe™ JBOF storage system. The NVMe™ JBOF storage system would then be connected to one or more host computers through a PCIe extension cable or NVMe™ over Fabrics (NVMf or NVMoF) interface.

Conveniently, when a host computer system is equipped with a device configured, according to aspects of the present application, to house video codec modules, scaling up video codec capability in the host computer system is as simple as adding storage capability to the device. As of 2018, there have been servers on the market that have 24 U.2 NVMe™ drive bays and NVMe™ JBOFs on the market that have 32 NVMe™ drive bays. With devices housing video codec modules, according to aspects of the present application, the video codec capabilities of such servers and JBOFs may be seen to be able to achieve very high density.

With a NVMe™ video codec device that houses video codec modules according to aspects of the present application, it is not necessary to install special or proprietary drivers to add video codec module support to an existing host computer executing a Linux operating system. The existing host computer may simply employ the video codec functionality in the NVMe™ video codec device through vendor-specific NVMe™ commands. As of 2018, the NVMe™ device driver is readily available for wide variety of Linux operating systems.

According to an aspect of the present disclosure, there is provided a computer peripheral video codec device. The computer peripheral video codec device includes a peripheral component interconnect express (PCIe) bus physical interface and a Non-Volatile Memory express (NVMe) module in communication with the physical interface, wherein the NVMe module is configured to execute a NVMe interface. The computer peripheral video codec device also includes a video encoder module in communication with the NVMe module, wherein the video encoder module is configured to initialize, in response to receiving a command from a host computer through the NVMe module, a video encoder instance.

According to another aspect of the present disclosure, there is provided a computer peripheral video codec device. The computer peripheral video codec device includes a peripheral component interconnect express (PCIe) bus physical interface and a Non-Volatile Memory express (NVMe) module in communication with the physical interface, wherein the NVMe module is configured to execute a NVMe interface. The computer peripheral video codec device also includes a video decoder module in communication with the NVMe module, the video decoder module configured to receive, from a host computer through the NVMe module, a command and initialize, in response to the receiving, a video decoder instance.

According to a further aspect of the present disclosure, there is provided a method of encoding a frame of video. The method includes selecting, at a host computer and from a set of Non-Volatile Memory express (NVMe) commands, a write command, thereby producing a selected write command, and issuing, to a video encoder module, the selected write command, thereby causing the video encoder module to receive a raw video frame from the host computer. The method further includes selecting, at the host computer and from the set of NVMe commands, a read command, thereby producing a selected read command, issuing, to the video encoder module, the selected read command, thereby causing the video encoder module to transfer an encoded frame to the host computer, and receiving, from the video encoder module, the encoded frame. Additionally, there is provided a host computer comprising a processor configured to implement a driver operable to carry out this method.

According to a still further aspect of the present disclosure, there is provided a method of decoding a frame of video. The method includes selecting, at a host computer and from a set of Non-Volatile Memory express (NVMe) commands, a write command, thereby producing a selected write command, and issuing, to a video decoder module, the selected write command, thereby causing the video decoder module to receive an encoded video frame from the host computer. The method further includes selecting, at the host computer and from the set of NVMe commands, a read command, thereby producing a selected read command, issuing, to the video decoder module, the selected read command, thereby causing the video decoder module to transfer a decoded video frame to the host computer and receiving, from the video decoder module, the decoded video frame. Additionally, there is provided a host computer comprising a processor configured to implement a driver operable to carry out this method.

According to an even further aspect of the present disclosure, there is provided a implementation of software stack that provides NVMe-based video codec service to applications in Linux systems using FFMPEG.

Other aspects and features of the present disclosure will become apparent to those of ordinary skill in the art upon review of the following description of specific implementations of the disclosure in conjunction with the accompanying figures.

It is known to be difficult to achieve high-density video codec functionality with current hardware-assisted video codec solutions, such as video codec modules built into CPUs or integrated into GPUs. This is important because the efficiency of operation of cloud-based video services may be directly dependent upon the density of available video codec functionality.

It may be considered that the storage industry has been dealing with scalability problems since its very beginning and, furthermore, that the industry has come up with good solutions. Aspects of the present application may be seen to mitigate the video codec scalability problem by enabling the video codec devices to use the known NVMe™ interface. Conveniently, the NVMe™ interface was originally defined for storage devices, such as SSDs. of the present application may be seen to take advantage of existing NVMe-based storage scalability solutions.

Scaling inside an existing computer is known as "vertical scaling." The devices that house one or more video codec modules have, in accordance with aspects of the present application, an NVMe™ interface. It is known that the NVMe™ interface was originally defined for storage device such as SSDs. It follows that devices that house one or more video codec modules and have a form factor of an SSD can be fit into storage servers that are typically designed to have plenty of NVMe™ SSD drive bays. Consequently, the devices that house one or more video codec modules in accordance with aspects of the present application allow for significant vertical scaling of video codec functionality.

Scaling outside an existing computer is known as "horizontal scaling." The devices that house one or more video codec modules and have an NVMe™ interface, in accordance with aspects of the present application, can be installed into storage devices, such as NVMe™ JBOFs, that connect with a host computer with PCIe extension cables or with an NVMe-over-fabrics interface.

FIG. 1 illustrates an internal structure for an implementation of a first type of device 101. This first type of device 101 combines NVMe™ SSD functionality with auxiliary video codec functionality and communicates over a PCIe bus 102 with a host computer 100.

In a manner consistent with a traditional NVMe™ SSD device, the first type of device 101 has an NVMe™ module 103 and a plurality of NAND flash devices 107 (only one is illustrated) as storage media. NAND flash memory, such as the NAND flash devices 107, is a type of non-volatile storage technology that does not require power to retain data. The NVMe™ module 103 is configured to execute an NVMe™ interface.

Between the NVMe™ module 103 and the plurality of NAND flash devices 107, a Flash Translation Layer 105 connects to the NVMe™ module 103 and to a NAND flash device interface 106. The NAND flash device interface 106 connects to the NAND flash device 107. As is known, the Flash Translation Layer 105 is usually implemented as firmware and is sometimes implemented with some hardware acceleration. The NAND flash device interface 106 typically includes a Physical layer (PHY), a micro sequencer and some firmware.

In a manner inconsistent with traditional NVMe™ SSD devices, the NVMe™ module 103 of the first type of device 101 also maintains a connection with a plurality of video codec modules 202. Each video codec module 202 may include a hardware accelerator (not shown), a processor (not shown) and a memory (not shown) that stores firmware for execution on the processor.

A representative one of the video codec modules 202 among the plurality of video codec modules 202 is illustrated as hosting a plurality of video codec instances 203. The NVMe™ module 103 is defined by NVM Express, Inc. of Beaverton, OR and implements a collection of communication standards between an NVMe™ driver 104 and the plurality of NAND flash devices 107 through the PCIe bus 102. The host computer 100 includes a processor (not shown) in communication with memory (not shown), with the memory storing instructions that allow the processor to implement the NVMe™ driver 104.

Notably, the NVMe™ collection of standards allows for vendor-specific fields within standard NVMe™ messages. Additionally, the NVMe™ collection of standards allows for vendor-specific commands. Some aspects of the present application make use of the NVMe™ vendor-specific fields to enable bidirectional communication between the host computer 100 and the video codec modules 202. Other aspects of the present application make use of the NVMe™ vendor-specific commands to enable communication between the host computer 100 and the video codec modules 202.

Figure 2:
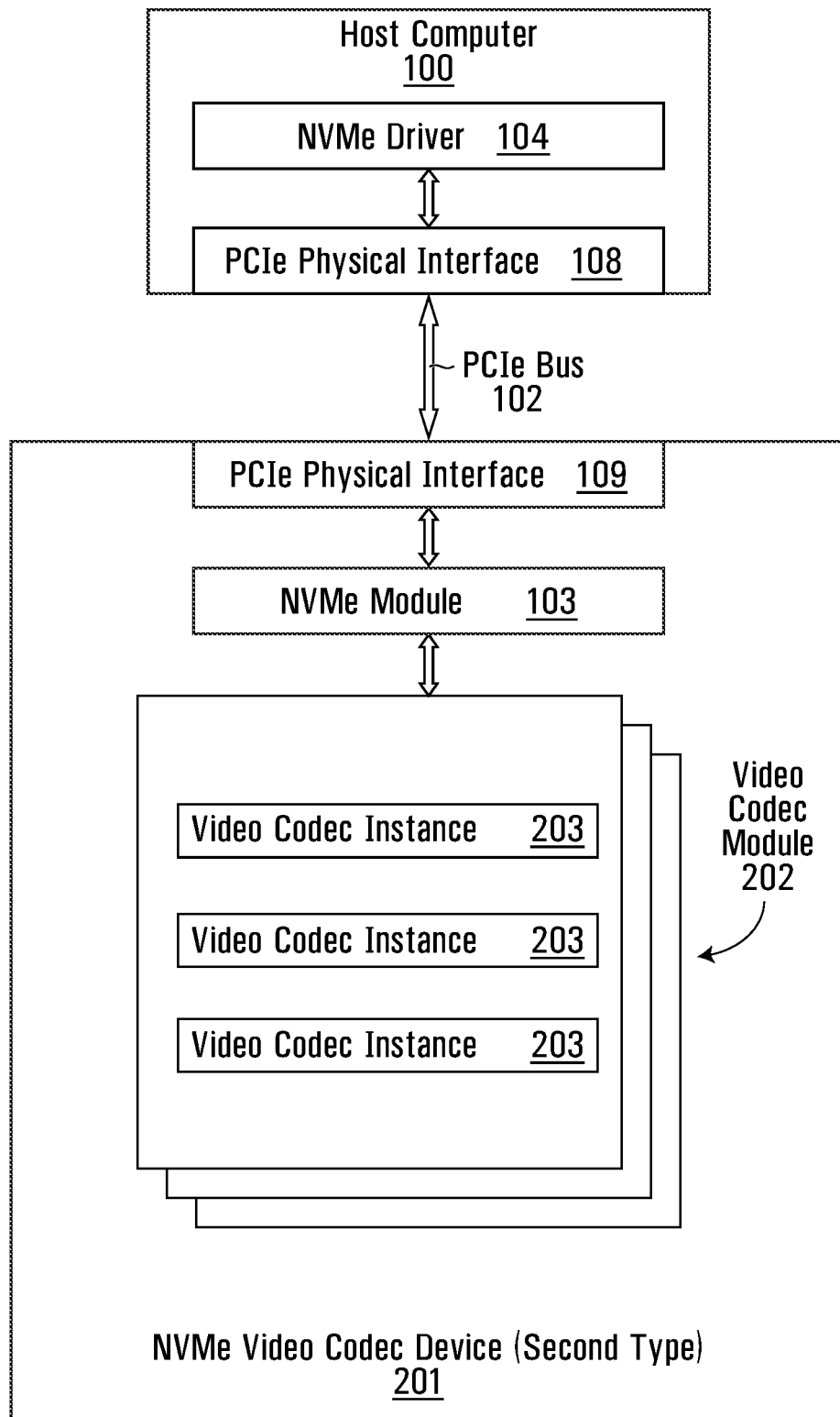
FIG. 2 illustrates an internal structure for an implementation of a second type of NVMe™ video codec device, in accordance with an aspect of the present application.

FIG. 2 illustrates an internal structure for an implementation of a second type of device 201. This second type of device 201 has no storage media and has, as a primary functionality, video codec functionality and, like the first type of device 101 in FIG. 1, communicates over the PCIe bus 102 with the host computer 100.

In a manner consistent with the first type of device 101, the second type of device 201 has the NVMe™ module 103 and the plurality of video codec modules 202. The representative one of the video codec modules 202 among the plurality of video codec modules 202 is illustrated as hosting the plurality of video codec instances 203. The NVMe™ module 103 facilitates communication with the NVMe™ driver 104 on the host computer 100 through the PCIe bus 102.

It is known that the NVMe™ collection of standards defines a data structure for an "Identify Controller" command and a "namespace" data structure. It is proposed herein that, when queried by the NVMe™ driver 104, the NVMe™ module 103 will report that the second type of device 201 has one namespace and that the one namespace has a size of zero. It should then be clear, to the host computer 100, that the second type of device 201 cannot be used as a storage device. The host computer 100 may, however, be configured to issue vendor-specific commands to communicate with the video codec modules 202 inside the second type of device 201.

NVM Express Inc. published the 1.0 version of the NVMe over Fabrics (NVMe-oF) specification on Jun. 5, 2016. NVMe-oF is designed to extend the high-performance and low-latency benefits of NVMe™ across network fabrics that connect servers and storage systems, such as Fibre Channel, Ethernet and InfiniBand.

Figure 3:
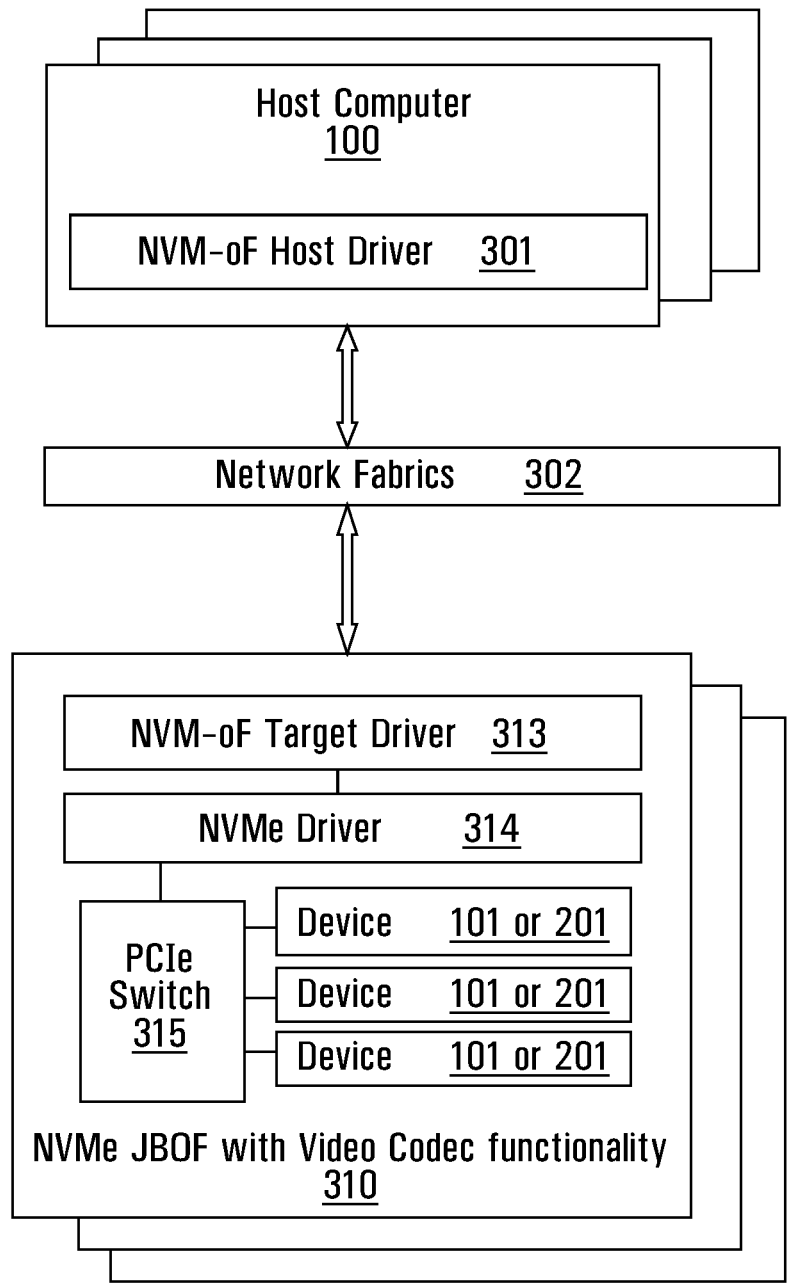
FIG. 3 illustrates an internal structure for an example implementation of a NVMe™ JBOF, in accordance with an aspect of the present application.

FIG. 3 illustrates an internal structure for an example implementation of a NVMe™ JBOF 310. The NVMe™ JBOF 310 has video codec functionality in accordance with aspects of the present application. Indeed, as illustrated in FIG. 3, a plurality of host computers 300 may communicate with a plurality of NVMe™ JBOFs 310 via network fabrics 302.

To communicate over the network fabrics 302, the host computer 300 has a NVM-oF host driver 301 and the example NVMe™ JBOF 310 has a NVM-oF target driver 313. The example NVMe™ JBOF 310 is illustrated as housing a plurality of devices, which may be devices of the first type 101 or devices of the second type 201.

The devices 101/201 each maintain a connection to a PCIe switch 315. The PCIe switch 315 communicates with the NVM-oF target driver 313 via a NVMe™ driver 314.

FIG. 4 illustrates an example portion 400 of a data structure for an NVMe™ "Identify Controller" command. The NVMe™ Identify Controller command may be used by the host computer 100 to allow the host computer 100 to learn some information about a connected NVMe™ device. The example portion 400 is byte range 3072-4095 of the data structure. This byte range is known to be set aside for vendor-specific purposes. Within the example portion 400 of the data structure are "vendor-specific fields." Each field has a byte range and a description.

For the purposes of aspects of the present application, the vendor-specific fields may be defined to allow for communication between the host computer 100 and the video codec modules 202.

In FIG. 4, byte 3094 is defined to allow the device 101 to indicate, to the host computer 100, a quantity of the video codec modules 202 present in the device 101. Bytes 3096 to 3607 are populated with the attributes of up to 16 video codec modules 202, with 32 bytes allocated to each of the video codec modules 202. Each video codec module 202 can be configured to be either an encoder or a decoder and each video codec module 202 can have multiple video codec instances 203, with each of the video codec instances 203 working on a separate video stream.

FIG. 5 illustrates a manner of organization for the 32 bytes allocated to each of the video codec modules 202 in the example data structure portion 400 of FIG. 4. A module identifier (ID) may be in byte 0. A module type (encoder or decoder) may be in byte 1. An indication of supported compressed video formats may be in byte 2, with specific bits in byte 2 being associated with a specific compressed video format. Bytes 4 and 5 may be used to indicate a maximum number of video codec instances 203 per video codec module 202. Bytes 6 and 7 may be used to indicate a processing capability, expressed as a number of 1080p frames per second. Bytes 8 through 11 may indicate a maximum picture size, expressed in width (bytes 8 and 9) and height (bytes 10 and 11). Bytes 12 through 15 may indicate a minimum picture size, expressed in width (bytes 12 and 13) and height (bytes 14 and 15). Bytes 16-31 may indicate other information.

It is known that the NVMe™ collection of standards defines a collection of Opcodes associated with various commands related to such tasks as creating and deleting queues, identifying controllers and getting or setting various features. Conveniently, there are some Opcodes that have been left for vendor-specific uses. Commands that may be issued generally fall into one of two categories: admin commands; and NVM commands.

FIG. 6 illustrates two tables: a vendor-specific admin commands table 602; and a vendor-specific NVM commands table 604. The vendor-specific admin commands in the vendor-specific admin commands table 602 may be defined to allow the host computer 100 to control the video codec modules 202 in such a manner as to allow the use, by the host computer 100, of the video codec instances 203. The vendor-specific NVM commands may be defined to allow for an exchange of data between the host computer 100 and the video codec modules 202.

Opcode C1h is associated, in the vendor-specific admin commands table 602, with a command name "Xcoder-Open." The Xcoder-Open command may be defined to allow the host computer 100 to allocate and initialize a video codec instance 203 within a specified video codec module 202.

Opcode C2h is associated, in the vendor-specific admin commands table 602, with a command name "Xcoder-Close." The Xcoder-Close command may be defined to allow the host computer 100 to close one of the video codec instances 203 within a specified video codec module 202.

Opcode C3h is associated, in the vendor-specific admin commands table 602, with a command name "Xcoder-Query." The Xcoder-Query command may be defined to allow the host computer 100 to check the status of each video codec module 202.

Opcode C4h is associated, in the vendor-specific admin commands table 602, with a command name "Xcoder-Reconfigure." The Xcoder-Reconfigure command may be defined to allow the host computer 100 to reconfigure one of the video codec instances 203.

Opcode 83h is associated, in the vendor-specific NVM commands table 604, with a command name "Xcoder-Write." The Xcoder-Write command may be defined to allow the host computer 100 to pass a video frame to one of the video codec instances 203.

Opcode 83h is associated, in the vendor-specific NVM commands table 604, with a command name "Xcoder-Read." The Xcoder-Read command may be defined to allow the host computer 100 to read a video frame from one of the video codec instances 203.

Figure 7:
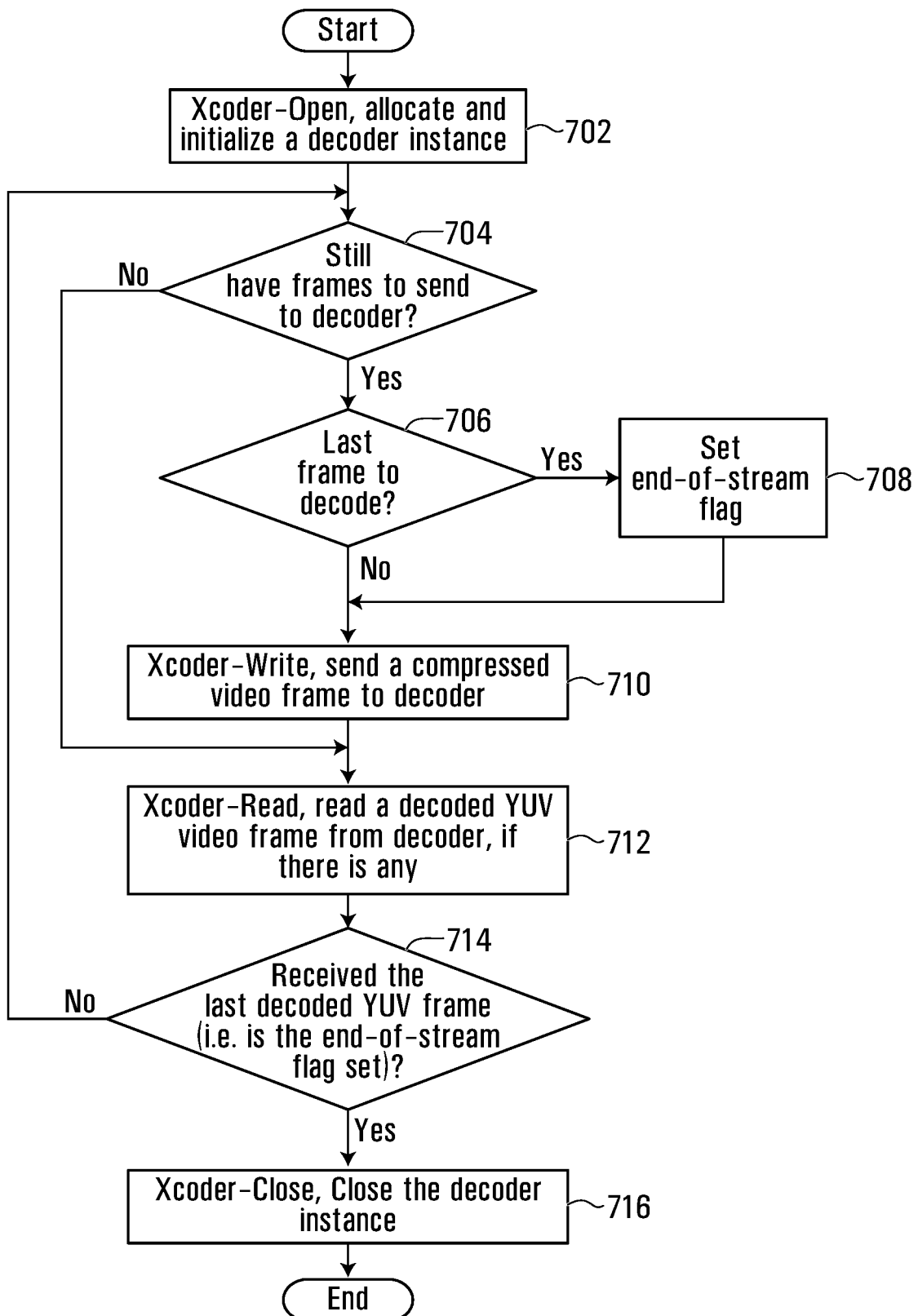
FIG. 7 illustrates, in flow chart form, example steps in a host computer method of decoding video, in accordance with an aspect of the present application.

FIG. 7 illustrates, in flow chart form, example steps in a method of decoding video.

Initially, the host computer 100 selects the Xcoder-Open command (e.g., Opcode C1h) from among the commands in the vendor-specific admin commands table 602 (FIG. 6). The host computer 100 then issues (step 702) the Xcoder-Open command to one of the video codec modules 202.

Figure 8:
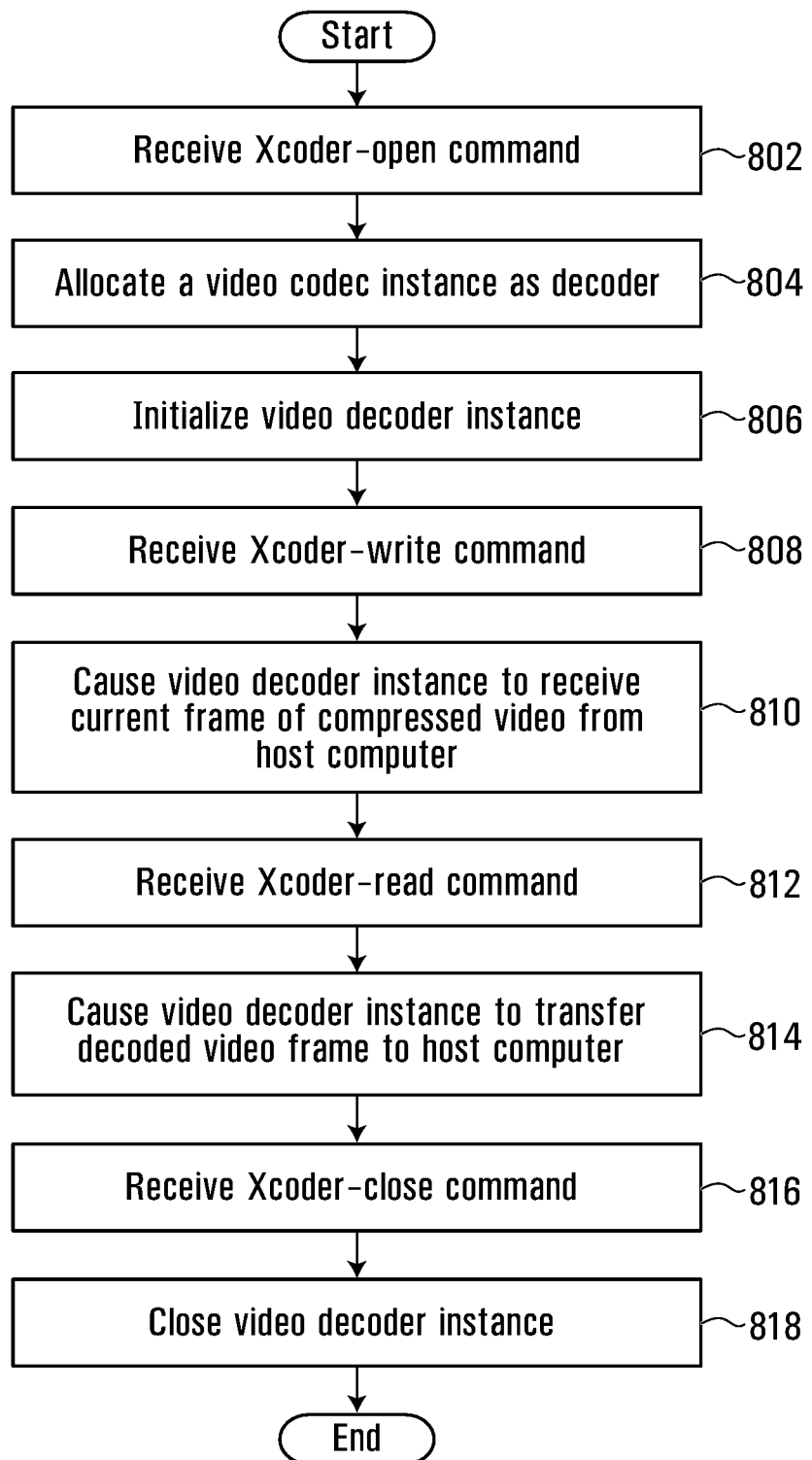
FIG. 8 illustrates, in flow chart form, example in a method carried out at the one of the video codec modules when decoding video responsive to commands received from the host computer in accordance with an aspect of the present application.

FIG. 8 illustrates steps in a decoding method carried out at the one of the video codec modules 202. The one of the video codec modules 202 initially receives (step 802) the Xcoder-Open command. In response to receiving (step 802) the Xcoder-Open command, the one of the video codec modules 202 allocates (step 804) one of the video codec instances 203 as a decoder, thereby creating a video decoder instance 203 and establishing the one of the video codec modules 202 as a video decoder module 202. The video decoder module 202 then initializes (step 806) the video decoder instance 203.

The host computer 100 then determines (step 704) whether there are frames remaining to be decoded.

Upon determining (step 704) that there are frames remaining to be decoded, the host computer 100 determines (step 706) whether the current frame is the last frame remaining to be decoded.

Upon determining (step 706) that the current frame is the last frame remaining to be decoded, the host computer 100 sets (step 708) an end-of-stream flag.

Upon determining (step 706) that the current frame is not the last frame remaining to be decoded or upon setting (step 708) the end-of-stream flag, the host computer 100 selects the Xcoder-Write command (e.g., Opcode 83h) from among the commands in the vendor-specific NVM commands table 604 (FIG. 6). The host computer 100 then issues (step 710) the Xcoder-Write command to the video decoder instance 203 to send the current frame of compressed video to the video decoder instance 203.

The video decoder module 202 then receives (step 808) the Xcoder-Write command. Responsive to receiving (step 808) the Xcoder-Write command, the video decoder module 202 causes (step 810) the video decoder instance 203 to receive the current frame of compressed (encoded) video from the host computer 100.

After having issued the Xcoder-Write command (step 710) or upon determining (step 704) that there are no more frames remaining to be decoded, the host computer 100 selects the Xcoder-Read command (e.g., Opcode 84h) from among the commands in the vendor-specific NVM commands table 604 (FIG. 6). The host computer 100 then issues (step 712) the Xcoder-Read command to the video decoder instance 203 to read, from the video decoder module 202, a decoded YUV frame, if such a frame is available.

The video decoder module 202 receives (step 812) the Xcoder-Read command. Responsive to receiving (step 812) the Xcoder-Read command, the video decoder module 202 causes (step 814) the video decoder instance 203 to transfer a decoded YUV frame to the host computer 100.

The host computer 100 then determines (step 714) whether the end-of-stream flag is set.

Upon determining (step 714) that the end-of-stream flag is set, the host computer 100 selects the Xcoder-close command (e.g., Opcode C2h) from among the commands in the vendor-specific admin commands table 602 (see FIG. 6). The host computer 100 then issues (step 716) the Xcoder-Close command to the video decoder instance 203.

The video decoder module 202 receives (step 816) the Xcoder-Close command. Responsive to receiving (step 816) the Xcoder-Close command, the video decoder module 202 closes (step 818) the video decoder instance 203.

Upon determining (step 714) that the end-of-stream flag is not set, the host computer 100 returns to determining (step 704) whether there are frames remaining to be decoded.

As will be well understood by a person of skill in the relevant art, a set of steps to be carried out at the video codec instance 203 is specific to the type of codec that is implemented by the video codec instance 203. Notably, the steps carried out by a codec implementing the known H.264/AVC standard are distinct from the steps carried out by a codec implementing the known H.265/HEVC standard.

Figure 9:
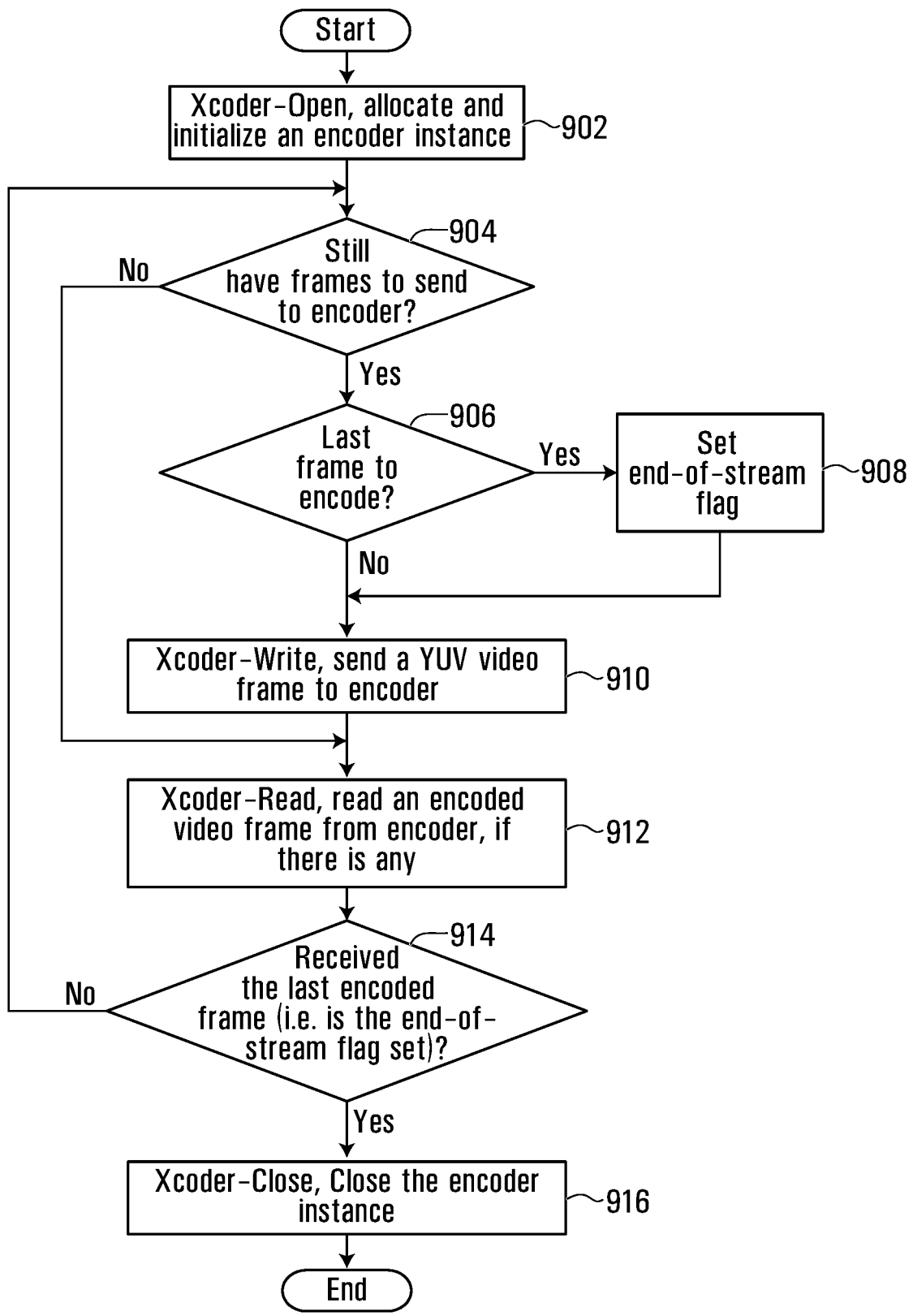
FIG. 9 illustrates, in flow chart form, example steps in a host computer method of encoding video, in accordance with an aspect of the present application.

FIG. 9 illustrates, in flow chart form, example steps in a method of encoding video.

Initially, the host computer 100 selects the Xcoder-Open command (e.g., Opcode C1h) from among the commands in the vendor-specific admin commands table 602 (FIG. 6). The host computer 100 then issues (step 902) the Xcoder-Open command to one of the video codec modules 202.

Figure 10:
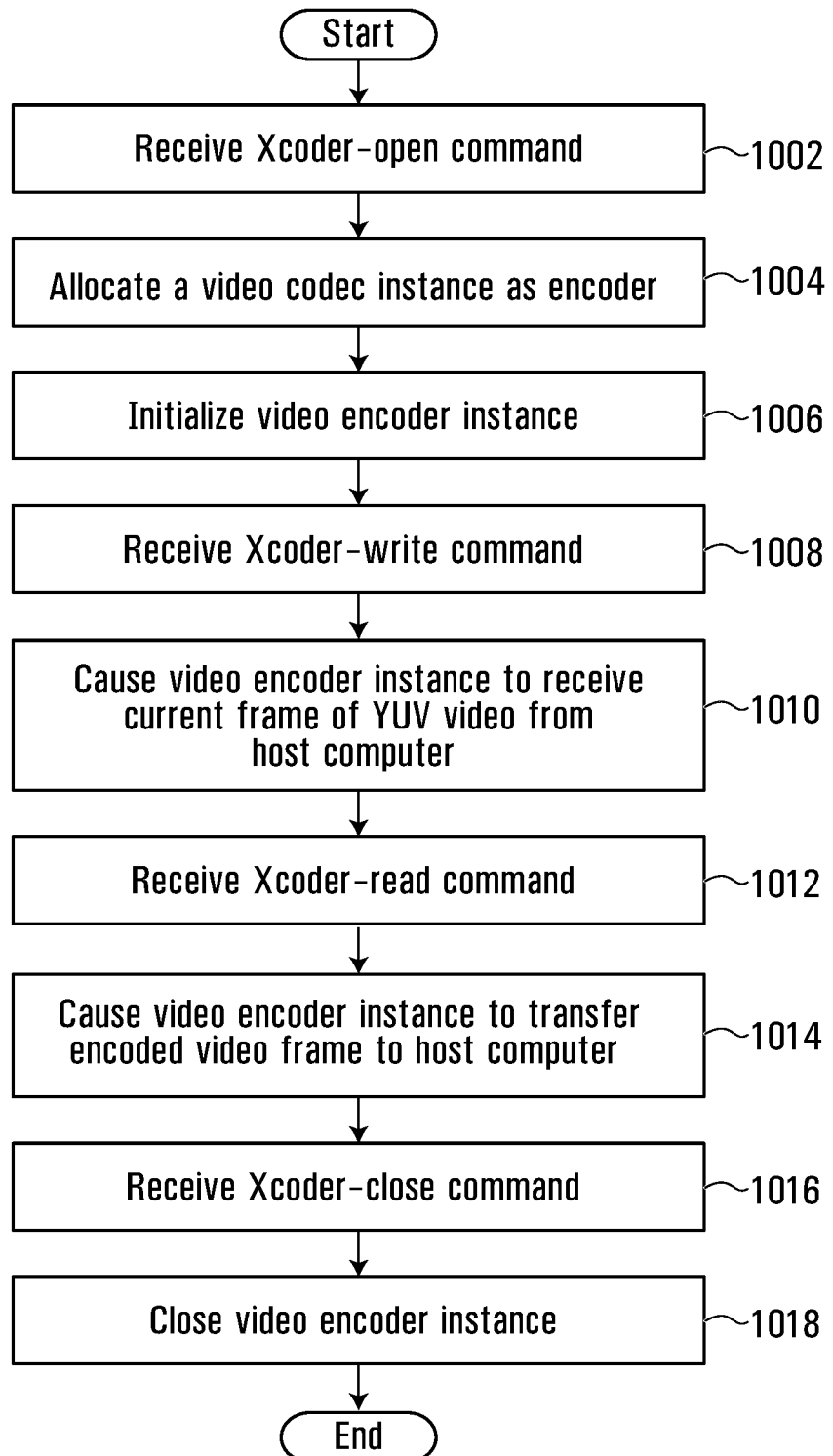
FIG. 10 illustrates, in flow chart form, example in a method carried out at the one of the video codec modules when encoding video responsive to commands received from the host computer in accordance with an aspect of the present application.

FIG. 10 illustrates steps in an encoding method carried out at the one of the video codec modules 202. The one of the video codec modules 202 initially receives (step 1002) the Xcoder-Open command. In response to receiving (step 1002) the Xcoder-Open command, the one of the video codec modules 202 allocates (step 1004) one of the video codec instances 203 as an encoder, thereby creating a video encoder instance 203 and establishing the one of the video codec modules 202 as a video encoder module 202. The video encoder module 202 then initializes (step 1006) the video encoder instance 203.

The host computer 100 then determines (step 904) whether there are frames remaining to be encoded.

Upon determining (step 904) that there are frames remaining to be encoded, the host computer 100 determines (step 906) whether the current frame is the last frame remaining to be encoded.

Upon determining (step 906) that the current frame is the last frame remaining to be encoded, the host computer 100 sets (step 908) an end-of-stream flag.

Upon determining (step 906) that the current frame is not the last frame remaining to be decoded or upon setting (step 908) the end-of-stream flag, the host computer 100 selects the Xcoder-Write command (e.g., Opcode 83h) from among the commands in the vendor-specific NVM commands table 604 (FIG. 6). The host computer 100 then issues (step 910) the Xcoder-Write command to the video encoder instance 203 to send the current frame of YUV video to the video encoder instance 203.

The video encoder module 202 then receives (step 1008) the Xcoder-Write command. Responsive to receiving (step 1008) the Xcoder-Write command, the video encoder module 202 causes (step 1010) the video encoder instance 203 to receive the current frame of YUV video from the host computer 100.

After having issued the Xcoder-Write command (step 910) or upon determining (step 904) that there are no more frames remaining to be encoded, the host computer 100 selects the Xcoder-Read command (e.g., Opcode 84h) from among the commands in the vendor-specific NVM commands table 604 (FIG. 6). The host computer 100 then issues (step 912) the Xcoder-Read command to the video encoder instance 203 to read an encoded video frame, if such a frame is available.

The video encoder module 202 receives (step 1012) the Xcoder-Read command. Responsive to receiving (step 1012) the Xcoder-Read command, the video encoder module 202 causes (step 1014) the video encoder instance 203 to transfer an encoded video frame to the host computer 100.

The host computer 100 then determines (step 914) whether the end-of-stream flag is set.

Upon determining (step 914) that the end-of-stream flag is set, the host computer 100 selects the Xcoder-Close command (e.g., Opcode C2h) from among the commands in the vendor-specific admin commands table 602 (see FIG. 6). The host computer 100 then issues (step 916) the Xcoder-Close command to the video encoder instance 203.

The video encoder module 202 receives (step 1016) the Xcoder-Close command. Responsive to receiving (step 1016) the Xcoder-Close command, the video encoder module 202 closes (step 1018) the video encoder instance 203.

Upon determining (step 914) that the end-of-stream flag is not set, the host computer 100 returns to determining (step 904) whether there are frames remaining to be encoded.

The first type of device 101 and the second type of device 201 may be formed to have a so-called "U.2" form factor. The U.2 form factor is a standard enterprise SSD form factor. Conveniently, the U.2 form factor is known to enable improved vertical scaling.

Figure 11:
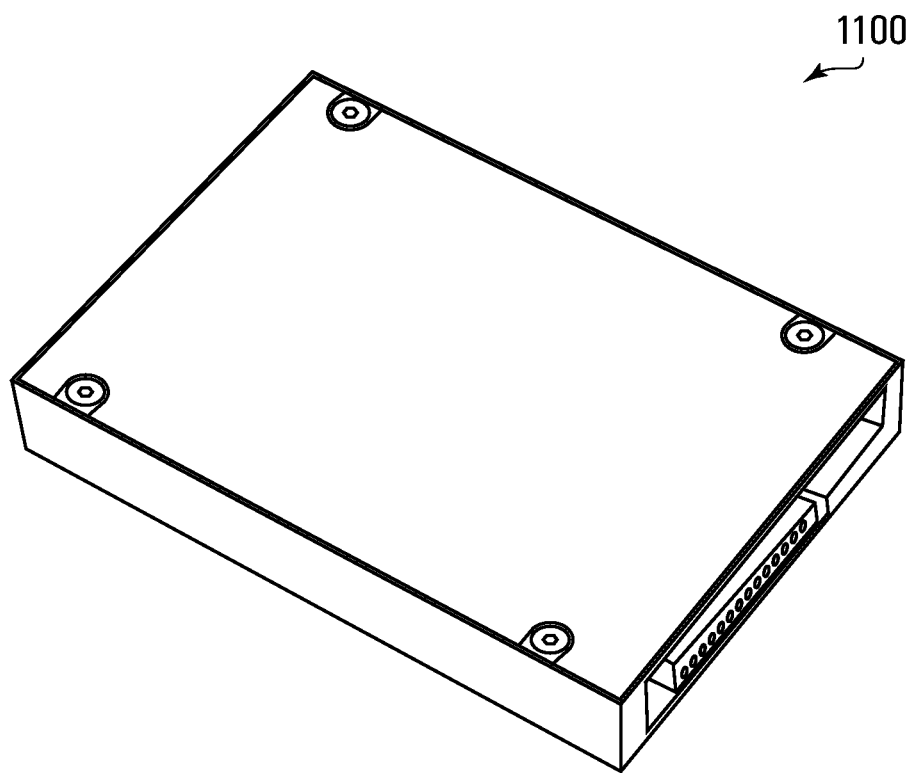
FIG. 11 illustrates an example NVMe™ video codec device in a U.2 form factor, in accordance with an aspect of the present application.

FIG. 11 illustrates an example NVMe™ video codec device 1100 in a U.2 form factor. In common with typical SSD drives with the U.2 form factor, the example device 1102 has an enclosure and connects to a motherboard (not shown) via a flexible cable (not shown). It may be shown that a storage server may have many more drive bays configured to receive drives having the U.2 form factor than AIC (add-in-card) expansion slots. When the first type of device 101 and/or the second type of device 201 are configured to have the U.2 form factor, a storage server can hold more of these devices and may, therefore, achieve a higher video codec capacity than an equivalent storage server having only AIC expansion slots.

Figure 12:
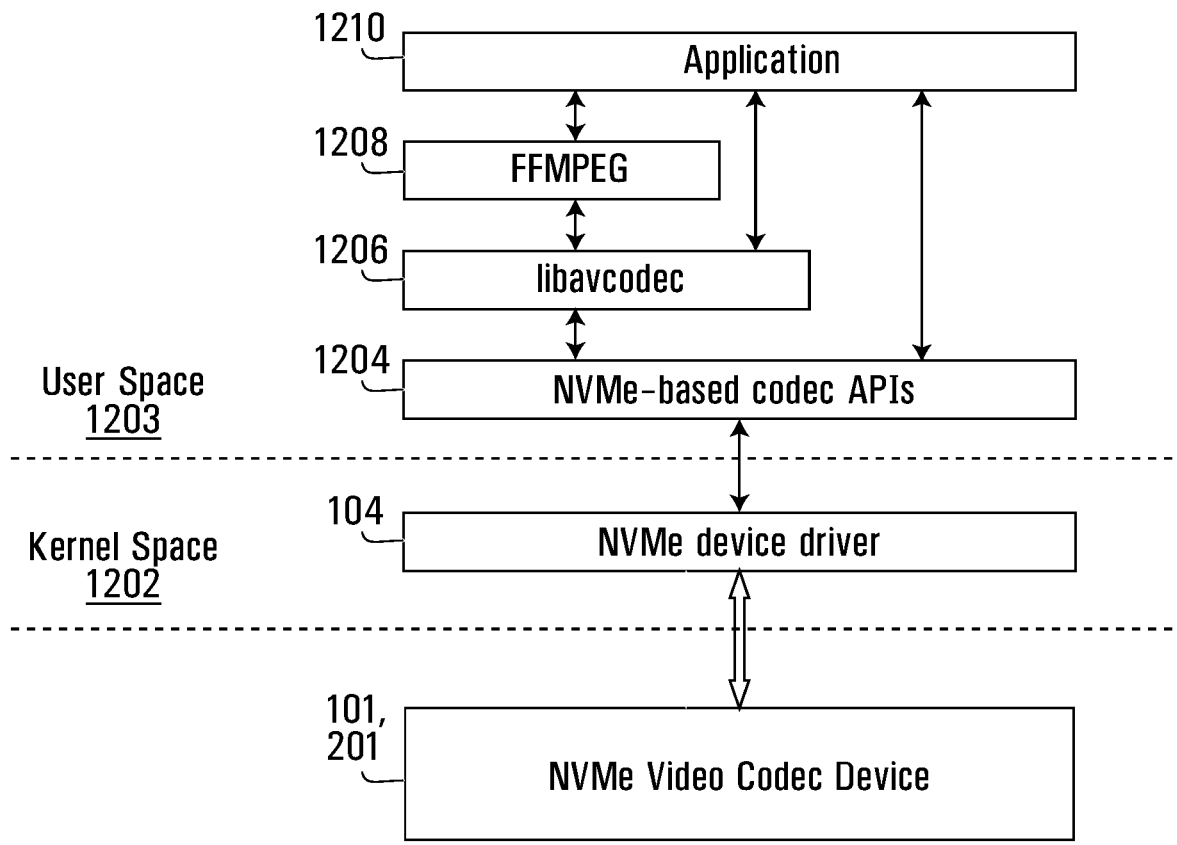
FIG. 12 illustrates an implementation of a software stack that provides NVMe-based video codec capabilities to applications on Linux systems, in accordance with an aspect of the present application.

FIG. 12 illustrates an implementation of a software stack that provides NVMe-based video codec capabilities to applications on Linux systems.

The software stack includes the NVMe Video Codec Device 101/102 familiar from FIGS. 1 and 2, a Kernel Space 1202 and a User Space 1203.

In the Kernel Space 1202, the NVMe™ driver 104 communicates with the NVMe Video Codec Device 101/201. A user library of NVMe-based codec Application Programming Interfaces (APIs) 1204 interfaces with the NVMe™ driver 104.

The User Space 1203 includes an FFMPEG application 1208. FFMPEG is a free software project, the product of which is a vast software suite of libraries and programs for handling video, audio and other multimedia files and streams. At the core of the project is the FFMPEG application 1208 itself, designed for command-line-based processing of video and audio files. The FFMPEG application 1208 is widely used for format transcoding, basic editing (trimming and concatenation), video scaling, video post-production effects and standards compliance. The FFMPEG project has developed "libavcodec," an audio/video codec library used by many commercial and free software products. The User Space 1203 includes an implementation 1206 of the FFMPEG libavcodec.

In operation, the FFMPEG application 1208 may invoke video codec functions through APIs provided by the libavcodec 1206.

The User Space 1203 also includes another application 1210. The other application 1210 may select to work with the FFMPEG application 1208, with the libavcodec 1206 or directly with the NVMe-based codec APIs 1204.

In the preceding, it has been recognized that the read and write commands in the current NVMe standard are not configured for use to communicate with an NVMe video codec device of the types (the first type 101, FIG. 1; the second type 201, FIG. 2; the JBOF 310, FIG. 3) disclosed in the present application. It is contemplated that, rather than employ a set of vendor-specific commands, the read and write commands in the current NVMe standard may be repurposed for use to communicate with an NVMe video codec device of the types disclosed in the present application. Furthermore, it is also contemplated that future versions of the NVMe standard may feature extended command sets that include commands for use to communicate with an NVMe video codec device of the types disclosed in the present application.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of decoding a frame of video, the method comprising:
   selecting, at a host computer and from a set of Non-Volatile Memory express (NVMe) commands, a write command, thereby producing a selected write command, wherein the host computer includes an operating system, wherein the host computer is configured to implement a software stack that provides NVMe-based video codec service including the set of NVMe commands to one or more applications in the operating system using FFMPEG;
   issuing, to a video decoder module, the selected write command, thereby causing the video decoder module to receive an encoded video frame from the host computer;
   selecting, at the host computer and from the set of NVMe commands, a read command, thereby producing a selected read command;
   issuing, to the video decoder module, the selected read command, thereby causing the video decoder module to transfer a decoded video frame to the host computer; and
   receiving, from the video decoder module, the decoded video frame.

2. The method of claim 1 wherein the set of NVMe commands comprises a set of vendor-specific commands distinct from a set of known commands published as part of a NVMe standard.

3. The method of claim 1 wherein the set of NVMe commands comprises a set of known commands published as part of a NVMe standard and repurposed for use with the video decoder module.

4. The method of claim 1 wherein the set of NVMe commands comprises a set of known commands published as part of a NVMe for use with the video decoder module.

5. The method of claim 1 wherein the host computer communicates with the video decoder module over a peripheral component interconnect express bus physical interface.

6. The method of claim 1 wherein the host computer communicates with the video decoder module through NVMe-over-fabrics interface.

7. The method of claim 1 wherein the video decoder module does not have storage media.

8. The method of claim 1 wherein the video decoder module is configured so that the computer peripheral device cannot be used as a storage device.

9. The method of claim 1 further comprising receiving, by the host computer, a namespace from the video decoder module, wherein the namespace has a size of zero.

10. The method of claim 1 wherein the operating system is a Linux system.

11. A host computer comprising:
    a processor configured to implement a driver operable to:
       select, from a set of Non-Volatile Memory express (NVMe) commands, a write command, thereby producing a selected write command;
       issue, to a video decoder module, the selected write command, thereby causing the video decoder module to receive an encoded video frame from the host computer;
       select, from the set of NVMe commands, a read command, thereby producing a selected read command;
       issue, to the video decoder module, the selected read command, thereby causing the video decoder module to transfer a decoded video frame to the host computer; and
       receive, from the video decoder module, the decoded video frame,
    wherein the processor is configured to execute an operating system, wherein the processor is configured to implement a software stack that provides NVMe-based video codec service including the set of NVMe commands to one or more applications in the operating system using FFMPEG.

12. The host computer of claim 11 wherein the set of NVMe commands comprises a set of vendor-specific commands distinct from a set of known commands published as part of a NVMe standard.

13. The host computer of claim 11 wherein the set of NVMe commands comprises a set of known commands published as part of a NVMe standard and repurposed for use with the video decoder module.

14. The host computer of claim 11 wherein the set of NVMe commands comprises a set of known commands published as part of a NVMe standard for use with the video decoder module.

15. The host computer of claim 11 wherein the processor is configured to communicate with the video decoder module over a peripheral component interconnect express bus physical interface.

16. The host computer of claim 11 wherein the processor is configured to communicate with the video decoder module through NVMe-over-fabrics interface.

17. The host computer of claim 11 wherein the operating system is a Linux system.

18. A host computer comprising:
a processor configured to implement a driver operable to:
receive a namespace from a video decoder module, wherein the namespace has a size of zero;
select, from a set of Non-Volatile Memory express (NVMe) commands, a write command, thereby producing a selected write command;
issue, to the video decoder module, the selected write command, thereby causing the video decoder module to receive an encoded video frame from the host computer;
select, from the set of NVMe commands, a read command, thereby producing a selected read command;
issue, to the video decoder module, the selected read command, thereby causing the video decoder module to transfer a decoded video frame to the host computer; and
receive, from the video decoder module, the decoded video frame.

19. The host computer of claim 18 wherein the set of NVMe commands comprises a set of vendor-specific commands distinct from a set of known commands published as part of a NVMe standard.

20. The host computer of claim 18 wherein the set of NVMe commands comprises a set of known commands published as part of a NVMe standard and repurposed for use with the video decoder module.

21. The host computer of claim 18 wherein the set of NVMe commands comprises a set of known commands published as part of a NVMe standard for use with the video decoder module.

22. The host computer of claim 18 wherein the processor is configured to communicate with the video decoder module over a peripheral component interconnect express bus physical interface.

23. The host computer of claim 18 wherein the processor is configured to communicate with the video decoder module through NVMe-over-fabrics interface.

24. The host computer of claim 11 wherein the processor is configured to receive a namespace from the video decoder module, wherein the namespace has a size of zero.

* * * * *